UNITED STATES PATENT OFFICE.

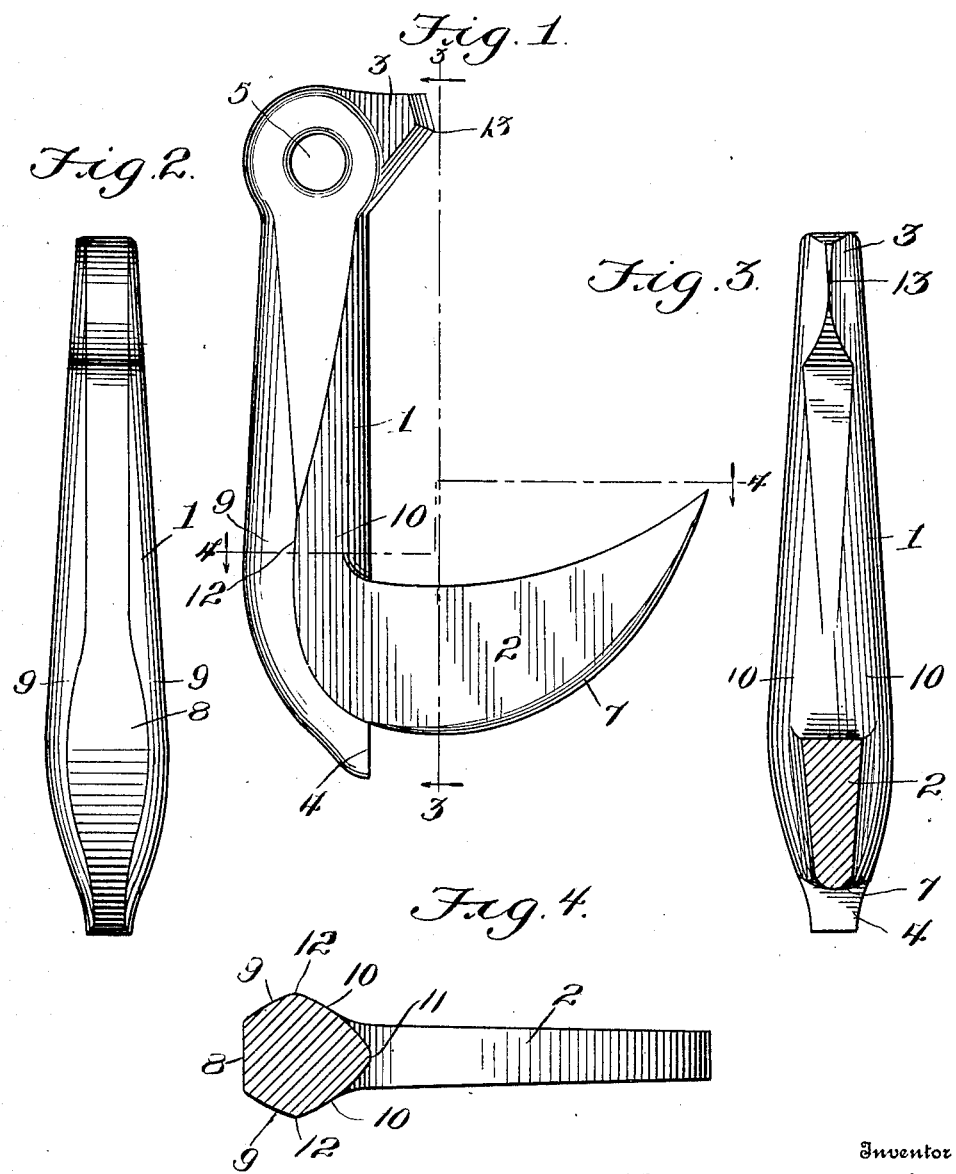

WALTER P. SMITH, OF GAINES, PENNSYLVANIA.

LOGGING-GRAB.

No. 925,961.   Specification of Letters Patent.   Patented June 22, 1909.

Application filed June 26, 1908. Serial No. 440,588.

*To all whom it may concern:*

Be it known that I, WALTER P. SMITH, a citizen of the United States, residing at Gaines, in the county of Tioga and State of Pennsylvania, have invented new and useful Improvements in Logging-Grabs, of which the following is a specification.

This invention relates to logging grabs, or as they are sometimes called, grab hooks, the object of the invention being to provide a practical grab or hook of the class described which will fully meet the present day requirements of men in this line of work.

The requirements of the grab as used to-day appear somewhat different from what they were a few years ago on account of the fact that the grap skipper is being generally used at present for pulling the grab out of the logs.

The object of this invention is to provide a practical grab which will stand the severe tests to which articles of this kind are subjected and which will enable them to be readily displaced from the log without impairing their strength. At the same time the grab of this invention is adapted to be removed from the log by means of the usual pick now also commonly employed for the purpose.

With the above and other objects in view, the nature of which will more fully appear as the description proceeds, the invention consists in the novel construction, combination and arrangement of parts as herein fully described, illustrated and claimed.

In the accompanying drawings:—Figure 1 is a side elevation of a logging grab or grab hook embodying the present invention. Fig. 2 is a plan view thereof, looking toward the concave face of the grab. Fig. 3 is a longitudinal section taken on the line 3—3 of Fig. 1, looking in the direction of the arrows. Fig. 4 is a cross section taken on the line 4—4 of Fig. 1, looking in the direction of the arrow.

The logging grab or grab hook of this invention comprises essentially a shank 1 and hook or bill 2, and a plate 3.

In the preferred embodiment of the invention, the grab or hook also comprises a projecting shoulder at one end of the shank and an eye 5 at the opposite end of the shank, said eye being adapted to receive the draft or coupling link, (not shown). The point or bill 2 of the hook is flat on opposite sides as shown in Fig. 4 and embodies a flat concaved curvilinear inner edge 6 which reaches from the shank to the point of the hook, while said hook also comprises a transversely rounded convexly curvilinear outer edge 7 which reaches from the shoulder 4 to the point of the hook, the edges 6 and 7 by reason of their formation operating to prevent the bending of the hook backward toward the shank 1 of the grab in the operation of driving the grab into hard wood.

By reference to Fig. 4, it will also be observed that the opposite side face of the hook 2 converge slightly toward the point of the hook so as to facilitate the dislodgment of the hook from the log.

The principal feature of the invention resides in the particular shape and formation of the shank 1 of the grab, which, it will be observed is of the greatest thickness at a point intermediate the ends of the shank as best illustrated in Figs. 2 and 3, the greatest thickness occurring where the shank is subjected to the blows of the mallet or sledge, by which it is driven into the log.

8 designates the impact face of the grab which occurs coincident with the thickest portion of the shank 1 and which is transversely flat as shown in Fig. 4 which is taken on the line 4—4 of Fig. 1. The shank is also of the greatest depth at such point as shown at Fig. 4 and it will be observed that the cross sectional shape of the shank at this point is somewhat in the shape of a diamond with rounded faces. In other words, the shank at its fixed portion or in line with the junction between the inner edge 6 of the hook and the shank 1 comprises reversely beveled side faces 9 and 10, the inclined faces 9 curving and converging toward the under side of the shank where they meet in a rounded ridge or vertex 11. From the side angles or vertices 12, the curved and slanting faces 9 converge toward the impact face 8 as best seen in Fig. 4.

By reason of the arrangement just described, when a blow is struck the grab by the skipper, the point of the skipper in striking against either of the faces 10 will glance an object directed under the shank or beneath the ridge 11 thereof and between said ridge and the log thus obviating direct impact between the skipper and the shank of the grab which direct blows are very weakening to the grab as a whole and soon result in the entire destruction or breakage thereof. Should the blow of the skipper be badly misdirected, it will strike against one of the reversely beveled faces 9 of the shank and the point of the skipper will be directed upward so as to pass over the top of the shank. By reason of the construction described, it will be next to impossible to strike a direct blow on the shank of the grab with the skipper as by reason of the reverse inclination of the beveled surfaces 9 and 10, the point of the skipper will be directed upward or downward as the case may be. This will overcome the main cause of breakage of these grabs which breakage usually occurs nearly on the line 4—4 of Fig. 1 or in other words, across the shank adjacent to a marginal line drawn through the shank adjacent to the point of junction between the shank and the inner concaved edge 6 of the hook 2.

In order to provide for the removal of the grab or hook by means of the pick in common use, I provide the shoulder 4, with a working face which is substantially flat and in line with the lower edge of the shank as shown in Fig. 1, said shoulder being adapted to rest against the log after the hook 2 has been driven into the log. It is to be understood that the point of the pick is driven under the shoulder 4 and between said shoulder and the log in the act of removing the grab from the log.

The blade 3 is designed to position the grab in the particular part of the driving operation by placing the point of the blade in contact with the log and striking a light blow on the end of the grab from which the blade 3 projects thus embedding the blade 3 in the log. The mallet or sledge is then used on the impact surface 8 to drive the hook 2 securely into the log. It will be observed that the blade 3 is provided with a diamond shaped point 13 beveled reversely on opposite sides which greatly facilitate centering the device as a whole and driving the blade into the log. The shape of the joint 13 also avoids the liability of the grab being sheered off the log in imparting the initial blow thereto to embed the blade 3 in the log.

The construction above described provides for the ready and easy extraction of the grab or hook from the log and greatly increases the life and durability of the device as a whole as it provides for a greater altitude in the manner of misdirecting blows to the skipper. It will, of course, be understood that the grab or hook may be made in various sizes to suit the demands of the trade.

I claim:—

A logging grab comprising a main body or shank, and a pointed hook extending substantially at a right angle to the body or shank, said shank being provided at each of its opposite sides with reversely beveled side faces which meet in an angular side ridge and slope in opposite directions from such ridge toward the upper and lower sides of the shank, forming reversely inclined skipper deflecting surfaces.

In testimony whereof I affix my signature in presence of two witnesses.

WALTER P. SMITH.

Witnesses:
SCOTT S. KING,
Mrs. E. H. SMITH.